April 3, 1951        L. A. EVANS        2,547,630

FLUID-TIGHT SHIELD FOR ROTATABLE SHAFTS

Filed Jan. 3, 1949

Inventor:
Liley A. Evans,
by Richard E. Harley
Her Attorney.

Patented Apr. 3, 1951

2,547,630

UNITED STATES PATENT OFFICE 2,547,630

FLUID-TIGHT SHIELD FOR ROTATABLE SHAFTS

Liley A. Evans, Richland, Wash., assignor to General Electric Company, a corporation of New York Application January 3, 1949, Serial No. 68,993

3 Claims. (Cl. 286—29)

My invention relates to a water or fluid-tight shield for a rotatable control or fastening device such as an adjustable screw control device or similar rotatably adjustable shaft. It has for its object the provision of a water-tight or fluid-tight shield which permits the adjustment of a device of this character while it is immersed in water, liquids, or fluids.

In general, my invention comprises a closed collar or tubular member slidably encircling the shaft that is desired to be rotatably adjusted, and surrounded by an imperforate resilient member secured to the collar in a water-tight manner. In order to permit adjustment of the shaft, a driving member is secured within the slidable collar external to a correspondingly aligned socket formed in the top of the shaft. By distending the resilient member, the driving member may be inserted within the socket and turned to an extent determined by the resiliency of the surrounding member. If further adjustment is required the driving member is withdrawn and the procedure is repeated.

Figure 1:
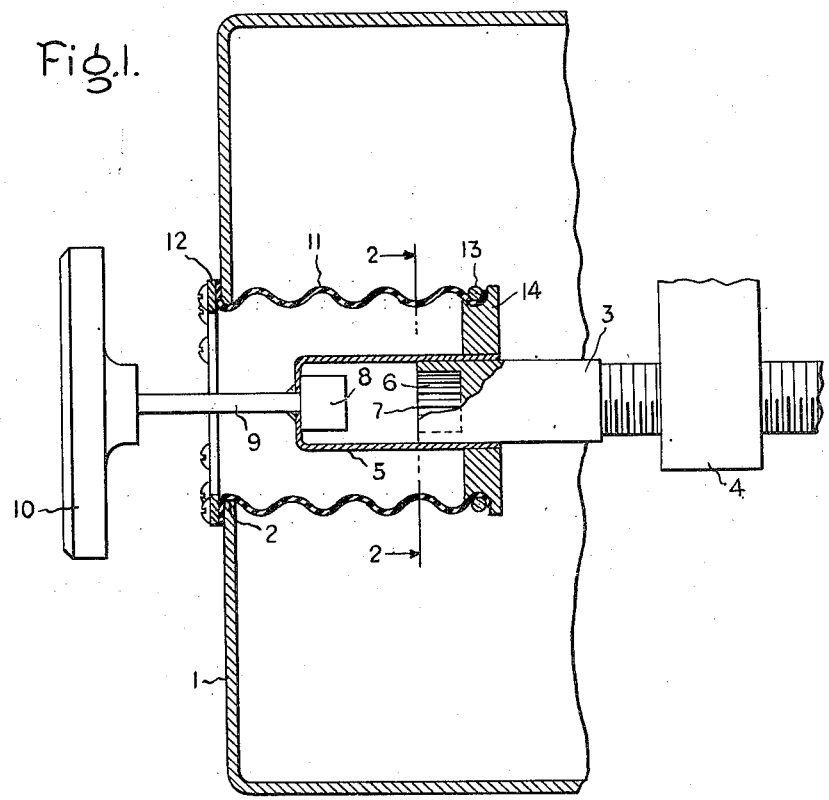
Figure 2:
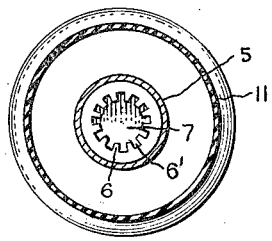

For a more complete understanding of my invention reference should be made to the accompanying drawing in which Fig. 1 is a sectional view of a screw control device embodying my invention, and Fig. 2 is a sectional view taken along line 2—2 of Fig. 1.

Referring to the drawing, I have shown my invention in one form as comprising an outer enclosing member 1 having an aperture 2 aligned to a rotatably adjustable cylindrical shaft 3 which is threaded to a retaining member 4. A cylindrical collar or tubular member 5, closed at one end, is a free fit around shaft 3 to allow collar 5 both to slide and to pivot thereon.

In order to adjust shaft 3 within collar 5, many different types of non-circular driving members and co-operating sockets may be provided. I prefer to use a driving member shaped generally in the form of a screw driver and a socket in which a plurality of diametrically opposed longitudinal splines 6 formed by notched cavities or recesses 6' are provided in the walls surrounding a cylindrical socket 7 in the top of shaft 3 as illustrated in Fig. 2. A flat blade 8, constructed to fit contiguously within any pair of diametrically opposed cavities, is normally held in a position within collar 5 externally aligned to socket 7 by an arm 9 which extends through the top of collar 5 and is secured to the collar by welding or any other suitable water-tight means. A knob 10 for turning blade 8 may be secured to the other end of arm 9.

In order to permit blade 8 to be inserted into and withdrawn from the notched cavities 6 and yet prevent passage of fluids into the internal mechanism, I provide an imperforate resilient member shown in the form of a bellows 11, preferably of rubber composition, which is secured at one end to the outer enclosing member 1, by a clamping ring 12 or other suitable means of forming a fluid-tight connection. Bellows 11 is also secured in a fluid-tight manner at the other end by such means as a circular clamp 13 to an annular shoulder or ring 14, which is welded, spun or otherwise suitably sealed to collar 5. Collar 5 is normally maintained by bellows 11 in a position extending some distance beyond the top of shaft 3 as illustrated in Fig. 1. By depressing collar 5, bellows 11 is distended and blade 8 may be inserted within the pair of notched cavities that are suitably aligned thereto.

In the operation of my invention, knob 10 is depressed, sliding collar 5 on shaft 3 and distending bellows 11 until blade 8 is inserted within a pair of notched cavities 6 of socket 7. Knob 10 may be turned to an extent determined by the twistable elasticity of bellows 11, thereby causing both collar 5 and shaft 3 to rotate correspondingly. Blade 8 is then withdrawn and the bellows 11 together with collar 5 are allowed to return to their original position leaving shaft 3 in its adjusted position. If further adjustment of shaft 3 is required, the above procedure is repeated until the desired position is attained.

As can be seen from the foregoing description, the fluid-tight shield which I have provided is both simple in construction, yet effective in operation and easily adapted to many different types of adjustable shafts. The use of a resilient surrounding member allows both reciprocating and pivotal motion of the driving member and coincidently supports the adjusting mechanism. The slidable collar assures alignment of the entire shield, and in the instant embodiment of my invention assures alignment of the screw driver blade to the corresponding cavities formed in the shaft to be adjusted.

While I have shown a particular embodiment of my invention, it is to be understood that I do not wish to be limited thereto since many modifications may be made, and I, therefore, aim to cover by the appended claims all such modifications as fall within the true spirit of my invention.

What I claim as new and desire to secure by Letters Patent of the United States is:

1. The combination with a rotatably adjustable shaft, of a shield for said shaft comprising an outer enclosing member, a tubular member encircling said shaft, an imperforate resilient member surrounding said tubular member and having one end secured in a fluid-tight manner to said tubular member and having its outer end secured in a fluid-tight manner to said outer enclosing member, and a driving member secured to and within said tubular member external to the encircled end of said shaft, said encircled end of said shaft having a socket formed therein aligned to and accommodating said driving member, said tubular member being rotatable on said shaft and slidable longitudinally thereof and said resilient member being extensible and twistable thereby to permit engagement of said driving member and socket, and said driving member fitting contiguously against the walls of said socket when engaged to enforce rotation of said shaft upon a rotation of said tubular member.

2. In combination, a rotatably adjustable shaft having a non-circular socket formed in one end thereof, a tubular member slidably and rotatably encircling said socket end, a driving member secured within said tubular member external to said socket and having a configuration adapted to fit contiguously against the shaft wall within said socket, an outer enclosing member, an imperforate resilient member surrounding said tubular member and making a fluid-tight connection at one end with said tubular member and making a fluid-tight connection at its other end with said outer enclosing member, said resilient member being extensible and twistable to permit said driving member to be inserted within said socket, and driving means mechanically connected to said tubular member whereby said driving member may be twisted when engaged within said socket to adjust said shaft.

3. A fluid-tight shaft adjustment comprising a shaft to be adjusted having a cylindrical socket formed in one end thereof, said socket having a plurality of circumferentially arranged longitudinally extending splines, a tubular collar closed at one end and having its other end freely fitted around said socket end of said shaft, a driving member sealed through said closed end of said collar, said driving member including a flat blade extending within said collar adjacent said closed end and manually operable means for rotating said driving member extending externally from said closed end, an outer enclosing member having an aperture aligned to said shaft, and a resilient bellows sealed at one end to said outer enclosing member and sealed at its other end to said collar, said bellows permitting said blade to be inserted within said socket to engage said splines and adjust said shaft.

LILEY A. EVANS.

REFERENCES CITED

The following references are of record in the file of this patent:

UNITED STATES PATENTS

| Number | Name | Date |
|---|---|---|
| 1,374,571 | Hummel | Apr. 12, 1921 |

FOREIGN PATENTS

| Number | Country | Date |
|---|---|---|
| 95,537 | France | of 1872 |